United States Patent
Banjo (10) Patent No.: US 8,626,113 B2
(45) Date of Patent: Jan. 7, 2014

(54) PROVIDING COMMUNICATION SERVICE SESSIONS

(75) Inventor: David Banjo, Espoo (FI)

(73) Assignee: Nokia Corporation, Espoo (FI)

( * ) Notice: Subject to any disclaimer, the term of this patent is extended or adjusted under 35 U.S.C. 154(b) by 1693 days.

(21) Appl. No.: 11/387,706

(22) Filed: Mar. 24, 2006

(65) Prior Publication Data

US 2007/0136195 A1    Jun. 14, 2007

(30) Foreign Application Priority Data

Dec. 12, 2005 (GB) .................................. 0525244.0

(51) Int. Cl.
H04M 11/00 (2006.01)

(52) U.S. Cl.
USPC ........... 455/405; 455/406; 455/408; 455/411; 455/432.1

(58) Field of Classification Search
USPC ...................................... 705/50–79; 455/405
See application file for complete search history.

(56) References Cited

U.S. PATENT DOCUMENTS

| | | | | |
|---|---|---|---|---|
| 5,559,871 A * | 9/1996 | Smith ...................... | 379/115.01 |
| 5,892,900 A * | 4/1999 | Ginter et al. .................... | 726/26 |
| 5,898,915 A | 4/1999 | Reininghaus et al. | |
| 5,917,537 A * | 6/1999 | Lightfoot et al. ................. | 725/4 |
| 6,363,411 B1 * | 3/2002 | Dugan et al. .................. | 709/202 |
| 6,892,063 B2 * | 5/2005 | Savolainen .................... | 455/405 |
| 6,947,723 B1 * | 9/2005 | Gurnani et al. ................ | 455/406 |
| 6,985,439 B2 * | 1/2006 | Hosein .......................... | 370/230 |
| 7,239,623 B2 * | 7/2007 | Burghardt et al. ............ | 370/338 |
| 7,248,855 B2 * | 7/2007 | Joyce et al. .................... | 455/406 |
| 7,283,820 B2 * | 10/2007 | Kamijo et al. .............. | 455/435.1 |
| 7,336,941 B1 * | 2/2008 | Clingerman et al. ....... | 455/404.1 |
| 7,424,102 B2 * | 9/2008 | Koskinen et al. ......... | 379/114.22 |
| 7,450,591 B2 * | 11/2008 | Korling et al. ............. | 370/395.43 |
| 7,548,743 B2 * | 6/2009 | Cai et al. ....................... | 455/406 |
| 7,599,478 B2 * | 10/2009 | Cai et al. ................... | 379/114.21 |
| 2002/0054569 A1 * | 5/2002 | Morikawa ..................... | 370/252 |
| 2002/0169712 A1 * | 11/2002 | Ginzboorg et al. ............ | 705/39 |
| 2002/0176378 A1 * | 11/2002 | Hamilton et al. ............. | 370/328 |
| 2002/0176405 A1 | 11/2002 | Aijala | |

(Continued)

FOREIGN PATENT DOCUMENTS

EP    0 705 019 A2    4/1996
EP    1 496 712 A1    1/2005

(Continued)

OTHER PUBLICATIONS

Derfler, "How Networks Work", Bestseller Edition, 1996, Ziff-Davis Press, Emeryville, CA, all pages.*

(Continued)

Primary Examiner — Jacob C. Coppola
(74) Attorney, Agent, or Firm — Harrington & Smith (57) ABSTRACT

A communication system and method thereof are configured to provide a service including a communication network including a charging entity and a service provision node. A user terminal is configured to transmit a session control message to the charging entity identifying a service provision threshold determined by a user of the user terminal for a session of the service requested by the user of the user terminal. Monitoring means is configured to monitor provision of the session and, if the provision of the session exceeds the service provision threshold, to notify the service provision node to performs a predetermined action upon receipt of the notification.

26 Claims, 4 Drawing Sheets

(56) References Cited

U.S. PATENT DOCUMENTS

| | | | |
|---|---|---|---|
| 2002/0193093 A1* | 12/2002 | Henrikson et al. | 455/405 |
| 2003/0014367 A1* | 1/2003 | Tubinis | 705/64 |
| 2003/0084184 A1* | 5/2003 | Eggleston et al. | 709/234 |
| 2003/0088523 A1* | 5/2003 | Yui | 705/400 |
| 2003/0101266 A1* | 5/2003 | Trossen | 709/227 |
| 2003/0120595 A1* | 6/2003 | I'anson | 705/40 |
| 2003/0144951 A1* | 7/2003 | Leven | 705/40 |
| 2004/0015421 A1 | 1/2004 | Erfurt et al. | |
| 2004/0078341 A1* | 4/2004 | Steichen | 705/64 |
| 2004/0082363 A1* | 4/2004 | Hosein | 455/560 |
| 2004/0102182 A1* | 5/2004 | Reith et al. | 455/410 |
| 2004/0114739 A1 | 6/2004 | Hausmann et al. | |
| 2004/0198317 A1 | 10/2004 | Ishida | |
| 2005/0009505 A1* | 1/2005 | Triebel | 455/411 |
| 2005/0013423 A1 | 1/2005 | Eversen et al. | |
| 2005/0044138 A1* | 2/2005 | Albert et al. | 705/40 |
| 2005/0058070 A1* | 3/2005 | Burghardt et al. | 370/230 |
| 2005/0070251 A1* | 3/2005 | Satake et al. | 455/411 |
| 2005/0107065 A1* | 5/2005 | Bernhart | 455/405 |
| 2005/0222961 A1* | 10/2005 | Staib et al. | 705/64 |
| 2005/0235052 A1* | 10/2005 | Koskinen et al. | 709/223 |
| 2005/0238153 A1* | 10/2005 | Chevalier | 379/114.2 |
| 2005/0240520 A1* | 10/2005 | Stura et al. | 705/39 |
| 2005/0262020 A1* | 11/2005 | Karlsson | 705/41 |
| 2005/0271193 A1* | 12/2005 | Koskinen et al. | 379/114.01 |
| 2005/0276271 A1* | 12/2005 | Zhang | 370/395.21 |
| 2006/0008063 A1* | 1/2006 | Harnesk et al. | 379/114.01 |
| 2006/0047814 A1* | 3/2006 | Batz et al. | 709/226 |
| 2006/0111099 A1* | 5/2006 | Abdel-Kader | 455/421 |
| 2006/0153074 A1* | 7/2006 | Hurtta et al. | 370/230 |
| 2006/0270423 A1* | 11/2006 | Hellgren | 455/461 |
| 2006/0286963 A1* | 12/2006 | Koskinen et al. | 455/405 |
| 2007/0005764 A1* | 1/2007 | Teppo | 709/225 |
| 2007/0124254 A1* | 5/2007 | Watson et al. | 705/77 |
| 2007/0130389 A1* | 6/2007 | Petersson et al. | 710/52 |
| 2007/0136195 A1* | 6/2007 | Banjo | 705/43 |
| 2007/0156413 A1* | 7/2007 | Cai et al. | 705/1 |
| 2007/0185809 A1* | 8/2007 | Duan | 705/39 |
| 2008/0153457 A1* | 6/2008 | Stura et al. | 455/406 |
| 2008/0243655 A1* | 10/2008 | Cai et al. | 705/34 |

FOREIGN PATENT DOCUMENTS

| | | |
|---|---|---|
| WO | WO 00/04702 | 1/2000 |
| WO | WO 03/094495 A1 | 11/2003 |
| WO | WO 2004/008687 A1 | 1/2004 |

OTHER PUBLICATIONS

White, "How Computers Work", Millennium Edition, 1999, Que Corporation, Indianapolis, IN, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

ETSI TS 132 296 V6.2.0, "*Digital Cellular Telecommunications System (Phase 2+); Universal Mobile Telecommunications System (UMTS); Telecommunication Management; Charging Management; Online Charging System (OCS): Applications and Interfaces (3GPP TS 32.296 version 6.2.0 Release 6)*", Sep. 2005, pp. 1-65.

Hakala, Harri et al., "*Diameter Credit Control Application*", Aug. 12, 2004, pp. 1-110.

International Search Report PCT/IB2006/004032 filed Dec. 6, 2006.

* cited by examiner

PROVIDING COMMUNICATION SERVICE SESSIONS

TECHNICAL FIELD

This invention relates to providing communication service sessions in a wireless communication system.

BACKGROUND

Wireless communication systems enable users to access a wide variety of services whilst facilitating user mobility. Examples of mobile wireless communication systems include the Global System for Mobile Communications (GSM) and Universal Mobile Telecommunication System (UMTS) network standards. Many other mobile communication systems, both digital and analogue, can also be used to provide wireless communication services to users.

In addition to mobile communication systems, wireless local area network (WLAN) systems offer users wireless services. These systems often provide high-bandwidth services to users in "hotspots"—areas of limited, generally non-contiguous coverage. Hotspots are often set up in areas of high user density, such as airports or hotels. Examples of WLAN standards include, amongst others, IEEE 802.11b, IEEE 802.11g and HIPERLAN. WLAN systems can be part of, or complement, mobile communication systems.

The most well-established service offered by mobile communication networks is a voice telephony service. This is usually a circuit-switched service, whereby a channel is established for the duration of the session. In addition, modern mobile communication systems offer a variety of other types of service. These services include, for example, wireless application protocol (WAP) services, Internet access/browsing, gaming, instant messaging and streamed information services, amongst many others. Several of these services are supported using packet-switched connections, whereby packets of data are transmitted across the network when information needs to be sent, rather than maintaining a connection for the whole session.

One of the most significant barriers to mass market usage of non-voice services, such as mobile Internet access, is the concern by the end user's about cost, both in terms of the magnitude of mobile access and service charges, and the complexity and unpredictability of the tariff structure that underlies the charges.

In particular, many users are used to the concept of paying for voice services on the basis of the time spent during a call. However, many users are unfamiliar with concepts such as paying for the amount of data that is used during a session, as is often used to charge for packet switched services. In addition, when users are utilising a network that is not their home network, this adds another level of uncertainty as to how much a service might cost.

An example of where this sort of uncertainty may arise is where a user of a mobile network is roaming internationally, or when using a WLAN access network to connect to his/her home mobile network operator services. The user might wish to ensure that a browsing & streaming session that he/she was about to initiate did not, with all charges taken into account, exceed a predetermined amount; or that a notification would be provided to the user when a pre-defined cost had been reached.

Prepaid charging mechanisms are known, which protect against an overall overspend on the subscriber's part. Such prepaid mechanisms include Nokia IACC (In Advance Credit Check), Parlay Charging API (Application Programming Interface), CAMEL (Customised Applications for Mobile—Enhanced Logic), RADIUS (Remote Authentication Dial In User Service) with prepaid extensions, and Diameter Credit Control. However, these mechanisms alone do not allow the user to control the costs of services down to a level of granularity of an individual service session. Other known cost controls can be used by a post-paying subscriber to ensure that a predefined spending limit is not exceeded during the subscriber's billing period. These controls have also been described on a service-specific basis; e.g. to ensure that a subscriber will not spend more than a specific amount, e.g. €30 on gaming services on his/her monthly bill.

Whilst some limited control of service costs is possible using existing credit control mechanisms such as Diameter Credit Control (for example by using the Service-Parameter-Info attribute value pair (AVP)) this would only provide partial control of the costs of individual service sessions. To provide full control of the costs of individual service sessions additional AVPs would need to be defined and standardised, which are not currently present in these mechanisms.

The impact that the uncertainty associated with the charging of non-voice and roaming services was not initially envisaged when the networks to support these services were developed. As such, there are no existing technical solutions to alleviate this problem. Adding support in the network to allow for greater control of the costs of individual service sessions requires additional signalling and information to be exchanged in the network, as well as potentially requiring further user intervention. This obviously impacts the efficiency of service delivery, and may increase service delivery latency. The problem which currently exists is how to provide control mechanisms in a wireless communication network in order to increase user confidence in the costs of non-conventional services (and hence the up-take of such services) whilst balancing any corresponding impact on the network in terms of extra signalling and delay. Such control mechanisms have not previously been developed as online charging systems and interfaces/applications have not hitherto been advanced enough to enable this type of control.

SUMMARY

An aim of the present invention is to provide a mechanism that supports user-defined "one-off" session specific cost control, thereby giving the user of a certain service session confidence as to how much the service will cost.

According to one aspect of the present invention there is provided a method of providing a service in a communications network comprising:

transmitting a session control message from a user to a charging entity in the network identifying a service provision threshold determined by the user for a session of the service requested by the user; and monitoring provision of the session and, if it exceeds the service provision threshold, notifying a service provision node in the network which performs a predetermined action on receipt of the notification.

The service provision threshold can be monitored as a cost limit (or other unit/resource limit representing payment) or can be converted into a network resource usage threshold for monitoring purposes.

In one embodiment the step of notifying comprises sending a notification message from the charging entity in the network to the service provision node in the network.

In another embodiment the step of monitoring comprises translating the service provision threshold to a network resource threshold at the charging entity, transmitting the network resource threshold from the charging entity to the service provision node and monitoring network resource usage.

In another embodiment the step of transmitting a session control message is performed over a wireless channel. In another embodiment the predetermined action comprises terminating the session.

In another embodiment the predetermined action comprises sending a warning message to the user. In another embodiment the method further comprising the step of the user selecting whether to continue or terminate the session in response to the warning message.

In another embodiment the predetermined action is determined by the user. In another embodiment the predetermined action is defined in the session control message.

In another embodiment the predetermined action is determined by the network.

Preferably the method further comprises the step of authorising the user requesting the session of the service at an authorisation node. In another embodiment the step of authorising further comprises the step of the authorisation node querying a user profile. In another embodiment the step of authorising further comprises determining whether the user should be prompted to determine the service provision threshold for the session of the service.

Preferably the communications network is one of the following: GSM, GPRS, UMTS or WLAN.

According to another aspect of the present invention there is provided a communication system for providing a service comprising:

a communication network including a charging entity and a service provision node;

a user terminal arranged to transmit a session control message to the charging entity identifying a service provision threshold determined by a user of the user terminal for a session of the service requested by the user of the user terminal; and monitoring means arranged to monitor provision of the session and, if it exceeds the service provision threshold, to notify the service provision node which performs a predetermined action on receipt of the notification.

In one embodiment the charging entity is arranged to send a notification message to the service provision node, notifying the service provision node that the service provision threshold is exceeded.

In another embodiment the monitoring means is arranged to translate the service provision threshold to a network resource threshold at the charging entity, transmit the network resource threshold from the charging entity to the service provision node and monitor network resource usage.

In another embodiment the user terminal is arranged to transmit the session control message over a wireless channel.

In another embodiment the predetermined action comprises the service provision node being arranged to terminate the session.

In another embodiment the predetermined action comprises the service provision node being arranged to send a warning message to the user. In another embodiment the user terminal is arranged to prompt the user to select whether to continue or terminate the session in response to the warning message.

In another embodiment the predetermined action is determined by the user. In another embodiment the predetermined action is defined in the session control message.

In another embodiment the predetermined action is determined by the network.

Preferably the wireless communication system further comprises an authorisation node arranged to authorise the user requesting the session of the service. In another embodiment the authorisation node is arranged to query a user profile when authorising the user. In another embodiment the authorisation node is arranged to determine whether the user should be prompted to determine the service provision threshold for the session of the service.

Preferably the communications network is one of the following: GSM, GPRS, UMTS or WLAN. Preferably the user terminal is one of the following: a mobile phone; a personal computer (PC) or a personal digital assistant (PDA).

According to another aspect of the present invention there is provided a user terminal comprising:

means permitting a user of the user terminal to define a service provision threshold for a session of a service requested by the user of the user terminal;

transmitting means arranged to transmit a session control message to a charging entity in a network identifying the service provision threshold; and means of establishing the service session over a wireless channel with a service provision node in the network;

According to another aspect of the present invention there is provided a communications network comprising:

a charging entity arranged to receive a session control message transmitted from a user identifying a service provision threshold determined by the user for a session of a service requested by the user;

monitoring means arranged to monitor provision of the session and, if it exceeds the service provision threshold, send a notification message; and a service provision node arranged to receive the notification message and perform a predetermined action on receipt of the notification message.

The service provision threshold may be, for example, a cost threshold or limit.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
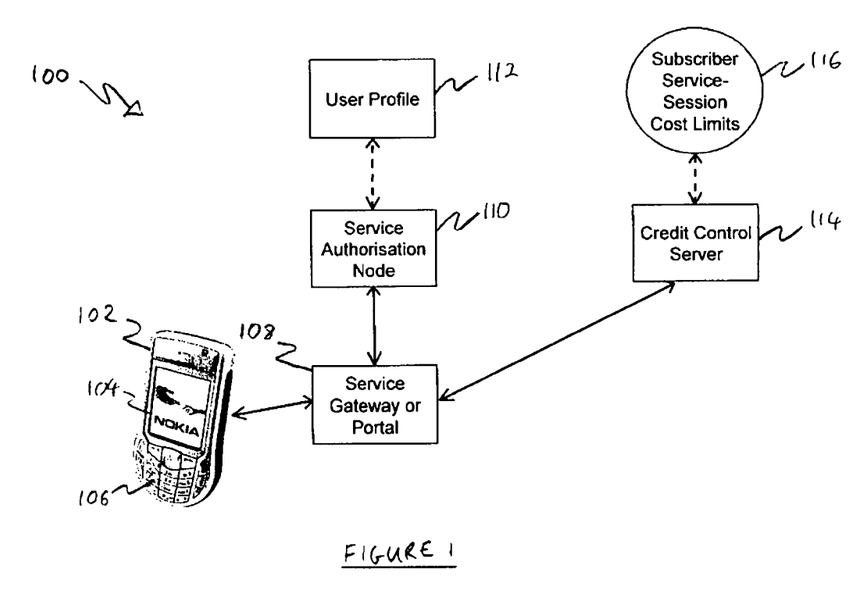
FIG. 1 shows a system for providing per-session cost control.

Reference will first be made to FIG. 1, in which is shown a system 100 for providing per-session control of costs for a user. A user can access services over a network using a user terminal 102. The user terminal 102 comprises a display 104 for displaying information and images, and a keypad 106 for entering data. The user terminal may comprise alternative means of data entry, such as a touch-sensitive screen and a stylus. The user terminal may be, for example, a mobile telephone, a personal computer (PC) or a personal digital assistant (PDA).

The user terminal 102 connects to a network using a wireless communication standard. The wireless communication standard could be GSM/GPRS, UMTS, WLAN or any other standard suitable for communication between the user terminal 102 and the network. Within the network is located a service gateway or portal 108. The service gateway or portal 108 provides the user terminal 102 with access to the requested service.

The service gateway or portal 108 is connected to a service authorisation node 110. The service authorisation node 110 can be, for example, an Authentication, Authorisation and Accounting (AAA) server or a policy server. The service authorisation node 110 has a connection to a user profile 112, which can provide authorisation settings specific to the subscriber.

The service gateway or portal 108 is also connected to a credit control server 114, which manages the charging of the user. The credit control server 114 is connected to a subscriber service-session cost limits function 116 which manages the session-specific cost limits.

The user profile 112 and the subscriber service-session cost limits function 116 are located in the user's home network. The credit control server 114 may also be located in the home network.

The system 100 shown in FIG. 1 allows a user to define a "one-off" maximum cost limit for a session that the user is about to begin. The credit control server 114 associated with the service session is advised of a limit that the user has set. When the limit is reached the system allows for the user to be notified and/or for the session to be terminated. This permits the setting of different limits for each session, depending on the user's requirements and circumstances. The user may require that a new cost limit is set for every session that is started. Alternatively, the user may configure their cost limits such that a default cost limit always applies to their sessions, unless this is overridden by the user.

Figure 2:
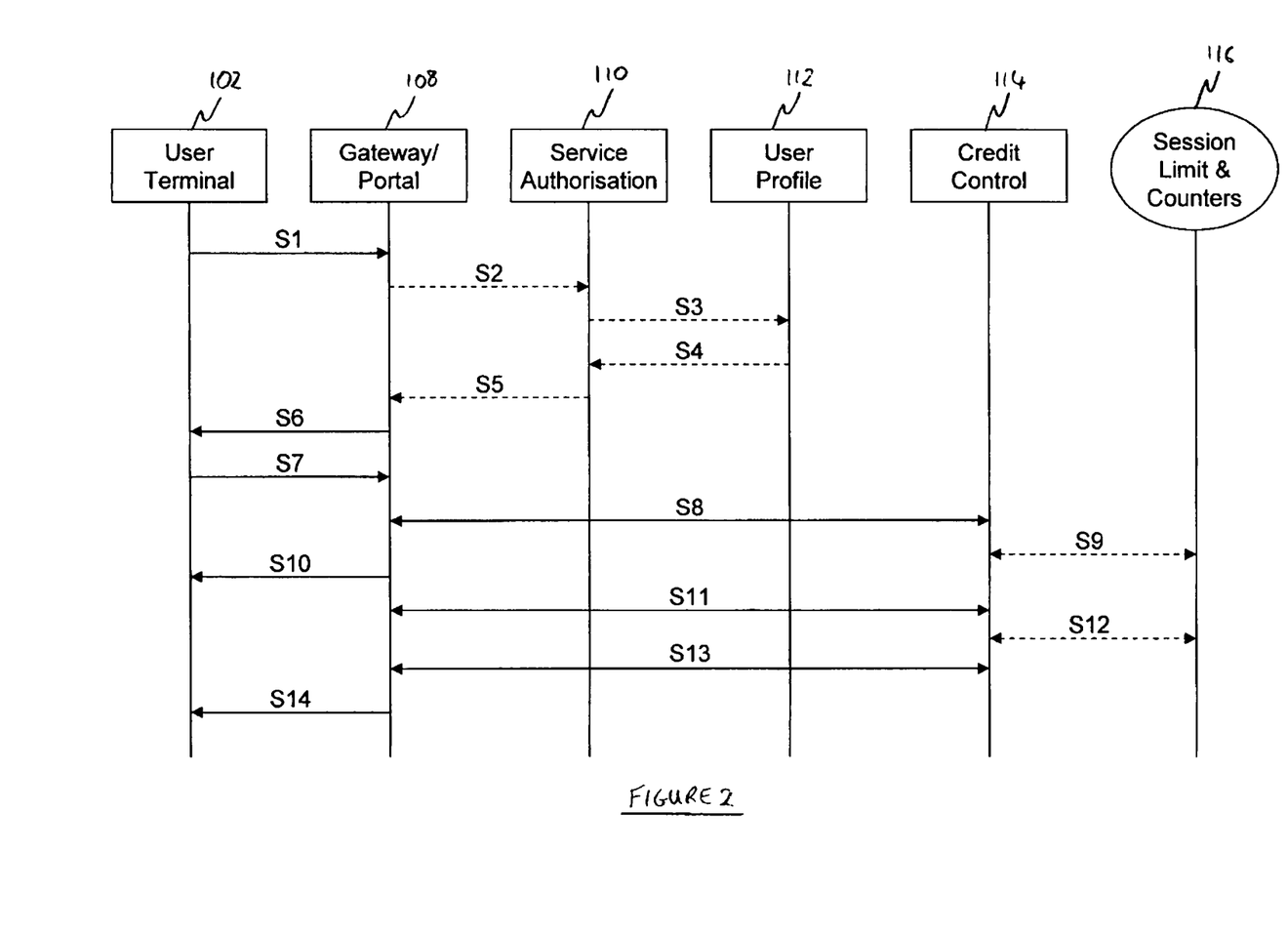
FIG. 2 shows signalling messages exchanged between the elements of the system of FIG. 1.

An example of the operation of the system 100 shown in FIG. 1 for the provision of per-session cost limits can be seen in FIG. 2. FIG. 2 shows the messages exchanged between the elements of the system 100 in FIG. 1.

In step S1, a user 102 initiates the use of a session-based service, for example an Internet browsing session, a streamed information feed, a gaming service, etc. The service is initiated by the user 102 contacting the service gateway or portal 108.

In step S2, the service gateway or portal 108 responsible for the service requests authorisation for the use of the specific service by the subscriber from a service authorisation node 110 (as mentioned, the service authorisation node may be a AAA or policy server).

The service authorisation node 110 queries the user profile 112 in step S3 to request the subscription specific authorisation settings. Then, at step S4, the user profile 112 responds by providing the user authorisation settings to the service authorisation node 110. The user authorisation settings may indicate that the user should be prompted to define a session specific limit for the use of the service. In alternative embodiments, there may be a "global" service-level setting used to apply this feature for all subscribers using the particular service—in which case the service authorisation node 110 can make the decision to prompt the user without the need for the information from the user profile 112.

In step S5, the service authorisation node 110 provides all the necessary service authorisation criteria to the service gateway or portal 108. This includes the need to prompt for a session specific cost limit from the user.

The service gateway or portal 108 utilises a user communication channel to commence or continue a dialog with the user of the user terminal 102 in step S6. The user is invited to specify a session cost limit or service provision threshold. This is done by displaying a message on the user terminal display 104, in response to which the user can enter the cost limit or threshold using the user terminal keypad 106. The cost limit may be specified using currency units or alternative resource units. The user can also specify what action to take when the limit is reached. The action to take can be, for example, a notification on the user terminal display 104 that the limit has been reached, and the user may further have the option of continuing or terminating the session. Alternatively, the user may configure the session to be automatically terminated upon reaching the limit. In a further alternative, the choice of action may be configured in the network and not by the user. The mechanism utilised for dialogue with the user terminal 102 can be, for example, the hypertext transport protocol (HTTP) or the session initiation protocol (SIP), or any other suitable mechanism.

Once the user has used the user terminal keypad 106 to indicate a session cost limit, and any additional information needed to define the behaviour of the system when the limit is reached, this information is sent to the service gateway or portal 108 in step S7 as a session control message.

Figures 3, 4:
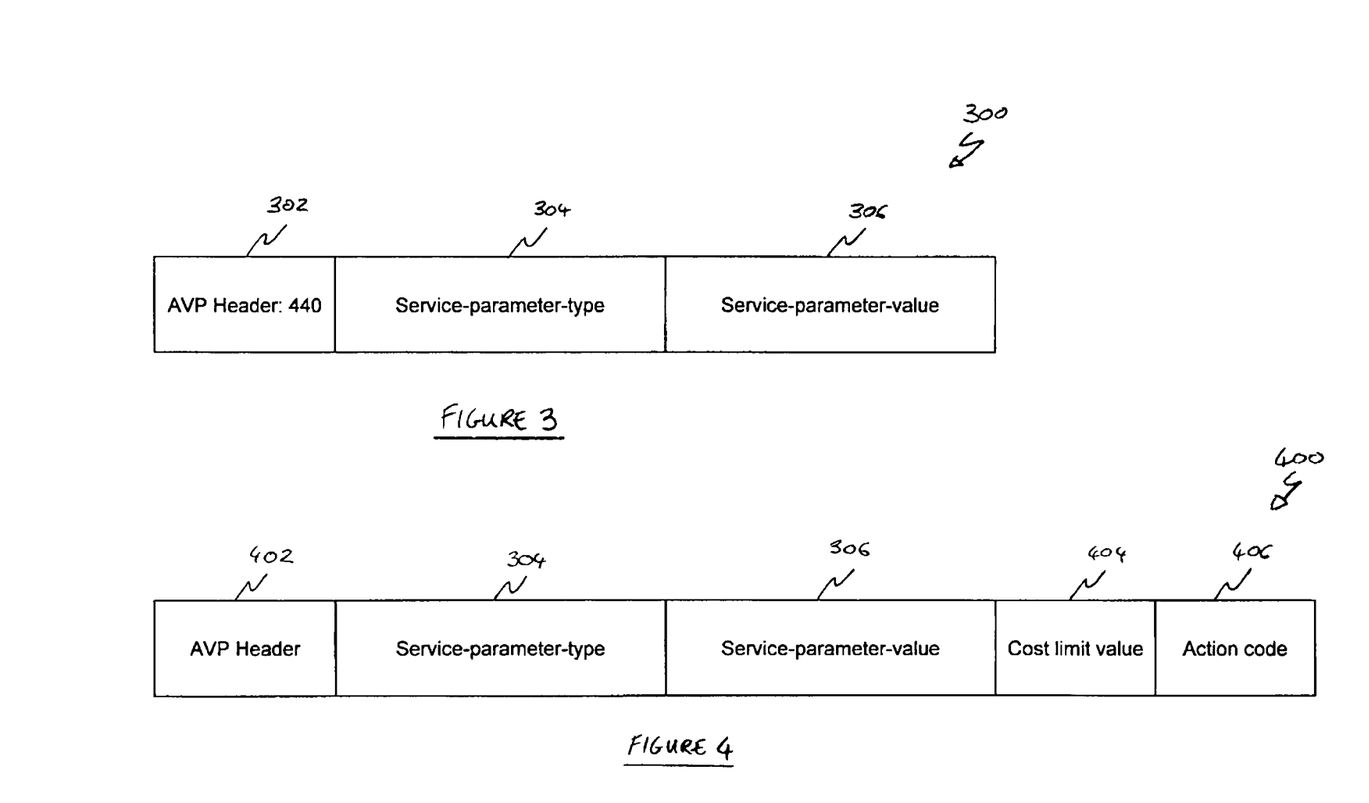
FIG. 3 shows the structure of a Diameter credit control AVP.
FIG. 4 shows the structure of a modified Diameter credit control AVP.

In step S8, the service gateway or portal 108 initiates online charging with a credit control server 114 including the need for a session specific cost limitation, and the values and attributes that should apply. This may take the form of additional information included within a standard credit control dialog, for example using Diameter credit control. FIG. 3 shows the structure of a Diameter credit control AVP of the type that can be extended to include information for per-session cost control. The AVP shown is a service-parameter-info AVP 300. The AVP 300 comprises a header 302, which contains a code that identifies the AVP. In the case of a service-parameter-info AVP, the code is 440. The AVP 300 also comprises a service-parameter-type field 304, which defines the type of service. The AVP further comprises a service-parameter-value field 306, which contains the value of the service parameter type. FIG. 4 shows the structure of a Diameter credit control AVP that has been extended to support per-session cost control. The extended AVP 400 comprises a header 402, similar to the header shown in FIG. 3, but this may be allocated a different AVP code. The extended AVP also comprises the same service-parameter-type 304 and service-parameter-value 306 fields as shown in FIG. 3. However, the AVP 400 has been extended to include a cost limit value field 404, which contains the value of a cost limit defined by the user. The AVP 400 has also been extended to include an action code field 406, which defines the action to take upon reaching the cost limit.

In other embodiments, the extended AVP 400 may also include a separate flag to indicate whether a cost limit has been defined for a session, although this may be encoded into the cost limit value field 404 (e.g. a value of zero in this field may indicate that no cost limit is set). In further embodiments, an entirely new AVP may be used that only contains the header 402, cost limit value field 404 and action code field 406, and is separate from the service-parameter-info AVP.

In step S9, the credit control server 114 communicates with a subscriber service-session cost limits function 116 that is responsible for storing the temporary service session limit and maintaining "counters" of usage relative to the limit. The credit control server 114 may be part of a larger charging system that also implements other functions such as correlation, balance management, offline charging, rating management etc., and the cost limits function 116 may be connected to this charging system (e.g. the cost limits function 116 is implemented in a rating server, a balance server, or a dedicated server). Alternatively, the cost limits function 116 may be implemented within the larger charging system that also implements the credit control server 114. In alternative embodiments, the session specific cost limit value and the usage counters might be stored in different elements or functions, and not in a single subscriber service-session cost limits function 116 (usage counters are sometimes implemented within the rating system). In further alternative embodiments, the session specific cost limit may simply be held in the working memory of the charging system or in the user profile server 112 or service authorisation node 110.

The service gateway or portal 108 then provides the service to the user terminal 102 in step S10. The service gateway or portal 108 continues the session with the credit control server 114 during the lifetime of the related service session, as indicated in step S11.

If the service usage reported using the session with the credit control server 114 in step S11 exceeds the defined service session limit then this is captured by the subscriber session cost limits function 116 at step S12. Alternatively, if the service usage exceeds a specified threshold, for example set at 90% of the limit, then this may also be captured by the subscriber session cost limits function 116.

In step S13 the service gateway or portal 108 is notified of the limit or threshold being exceeded, as part of the session with the credit control server 114. The service gateway or portal 108 then performs the defined actions related to the limit or threshold being exceeded (for example notifying the user and/or terminating the service session as mentioned above) at step S14.

Therefore, using the above-described operation, the user can ensure that a predefined cost limit is not exceeded for using a particular service.

Figure 5:
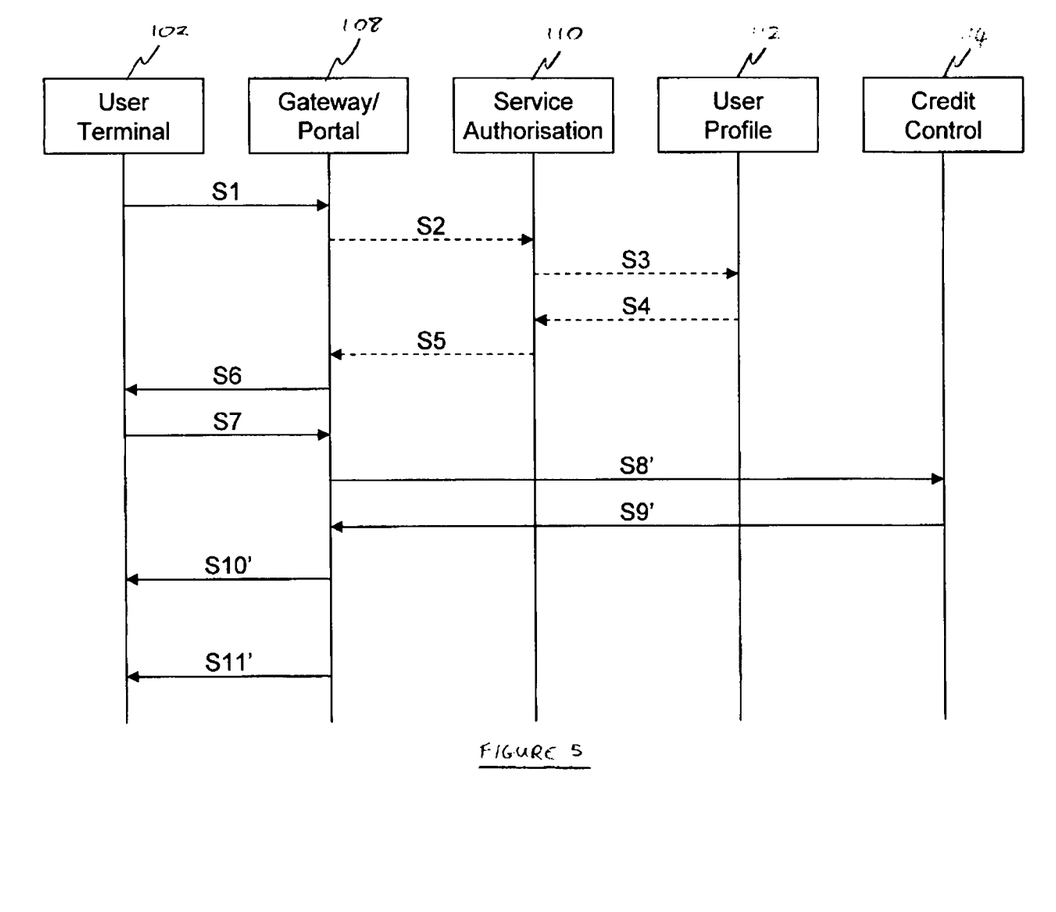
FIG. 5 shows alternative signalling messages exchanged between the elements of the system of FIG. 1.

An alternative embodiment for the operation of the system 100 shown in FIG. 1 for the provision of per-session cost limits can be seen in FIG. 5. In the embodiment shown in FIG. 5, the steps S1 to S7 are identical to those described with reference to FIG. 2, above. In step S8', the service gateway or portal 108 initiates online charging with a credit control server 114 including the need for a session specific cost limitation, and the values and attributes that should apply. This may take the form of additional information included within a standard credit control dialog, for example using Diameter credit control, as described above with reference to FIGS. 3 and 4. However, in the embodiment shown in FIG. 5, the subscriber session cost limits function 116 can be omitted. Instead, at step S9' the charging system is used to translate the user specified cost limit (via rating) to a relevant network resource limit value (for example expressed in Kbytes) that is communicated to the service gateway or portal 108. The service gateway or portal 108 then provides the service to the user terminal 102 in step S10'. The service gateway or portal 108 is then responsible for metering the resource usage against the limit value. When the limit is reached, the service gateway or portal 108 performs the defined actions related to the limit or threshold being exceeded (for example notifying the user and/or terminating the service session as mentioned above) at step S11'.

As mentioned previously, per-session cost control is advantageous when a user is roaming internationally, or when using a different type of network to access services, such as a WLAN network. The following illustrative example describes how per-session can apply in such a scenario. A user is a subscriber of a mobile operator in a first country. This operator may provide a public WLAN service that allows for the user and other subscribers to use WLAN access in various international (partner network affiliated) hotspots, with authentication and billing being performed by the operator's network. A feature offered by the mobile operator is for subscribers to set session-specific charging limits. The user takes advantage of the WLAN service when travelling in a second country and starts a WLAN access session in, for example, a coffee shop. The user is directed to a landing page that invites the user to set a session-specific cost limit in his home currency (for example, Euros). The user is likely to be unsure of all of the roaming and access charges that will apply, so the user defines a warning limit of, say, 2 Euros. The user can then start using the service. The user is notified (for example via a HTTP redirection) of the limit being reached after a certain period of time. The user may then decide that the charge is not unreasonable and continue to use the service, or the user may decide to terminate the service at this point.

The above is merely an example of how the invention can be used, and many other use cases are also possible.

The invention claimed is:

1. A method, comprising:
  querying, by an authorization node, a user profile of a user of a mobile user equipment roaming between a first mobile operator and a second mobile operator, wherein the user is a subscriber of the first mobile operator;
  prompting the user, in accordance with the user profile, to input a service provision threshold for a particular session of service and a predetermined action to take when the service provision threshold is reached;
  receiving a session control message at a charging device in a communications network, the session control message initiating a charging with the charging device for the particular session of service, wherein the session control message includes the service provision threshold and the predetermined action input by the user, and wherein the particular session of service is requested by the user from the second mobile operator;
  identifying with the session control message the service provision threshold input by the user for the particular session of service and the predetermined action to take when the service provision threshold is reached;
  translating, by the charging device, the service provision threshold to a network resource limit value relevant for the particular session of the service requested from the second mobile operator; and
  transmitting the network resource limit value from the charging device to a service provision node of the second mobile operator, wherein the transmitted network resource limit value prompts the service provision node to meter a provision of the particular session of the service against the network resource limit value and perform the predetermined action when the provision of the particular session reaches the network resource limit value.

2. A method as claimed in claim 1, wherein the network resource limit value is expressed in kilobytes of data.

3. A method as claimed in claim 1, wherein the service provision threshold specifies a cost limit in a currency which is different than a currency used in a location where the user is requesting the particular session of the service.

4. A method as claimed in claim 1, wherein the session control message is received over a wireless channel.

5. A method as claimed in claim 1, wherein the predetermined action comprises terminating the session.

6. A method as claimed in claim 1, wherein the predetermined action comprises sending a warning message to the user.

7. A method as claimed in claim 6, further comprising:
receiving an indication of whether the user desires to continue or to terminate the session in response to the warning message.

8. A method as claimed in claim 1, wherein the service provision threshold determined by the user and the predetermined action, specified by the user, to take are defined in the session control message using predefined fields.

9. A method as claimed in claim 1, wherein the service provision threshold determined by the user is defined in a cost limit value field of the session control message and the predetermined action, specified by the user, to take is defined in an action code field of the session control message.

10. A method as claimed in claim 1, further comprising:
authorizing the user requesting the provision of the particular session of the service with the authorization node.

11. A method as claimed in claim 10, wherein the authorizing further comprises determining whether the user is to be prompted to determine the service provision threshold for the provision of the particular session of the service.

12. A method as claimed in claim 1, wherein the communications network is a global system for mobile communications, general packet radio service, universal mobile telecommunication system, or wireless local area network.

13. A system comprising:
an authorization node processor and a charging device processor; and
at least one memory including computer program code that, when executed by at least the authorization node processor and charging device processor, causes at least the authorization node processor and charging device processor to perform a method, the method comprising:
querying, by the authorization node processor, a user profile of a user of a mobile user equipment roaming between a first mobile operator and a second mobile operator, wherein the user is a subscriber of the first mobile operator;
prompting the user, in accordance with the user profile, to input a service provision threshold for a particular session of service and a predetermined action to take when the service provision threshold is reached;
receiving a session control message at the charging device processor residing in a communications network, the session control message initiating a charging with the charging device processor for the particular session of service, wherein the session control message includes the service provision threshold and the predetermined action input by the user, and wherein the particular session of service is requested by the user from the second mobile operator;
identifying with the session control message the service provision threshold input by the user for the particular session of service and the predetermined action to take when the service provision threshold is reached;
translating, by the charging device processor, the service provision threshold to a network resource limit value relevant for the particular session of the service requested from the second mobile operator; and
transmitting the network resource limit value from the charging device processor to a service provision node of the second mobile operator, wherein the transmitted network resource limit value prompts the service provision node to meter a provision of the particular session of the service against the network resource limit value and perform the predetermined action when the provision of the particular session reaches the network resource limit value.

14. The system according to claim 13, wherein the service provision threshold specifies a cost limit in a currency which is different than a currency used in a location where the user is requesting the particular session of the service.

15. The system according to claim 13, wherein the network resource limit value is expressed in kilobytes of data.

16. The system according to claim 13, wherein the session control message is received over a wireless channel.

17. The system according to claim 13, wherein the predetermined action specified by the user comprises terminating the particular session.

18. The system according to claim 13, wherein the predetermined action specified by the user comprises sending a warning message to the user.

19. The system according to claim 13, wherein the service provision threshold determined by the user and the predetermined action specified by the user is defined in the session control message using predefined fields.

20. The system according to claim 13, wherein the service provision threshold determined by the user is defined in a cost limit value field of the session control message and the predetermined action, specified by the user, to take when the service provision threshold is reached is defined in an action code field of the session control message.

21. The system according to claim 13, further comprising: the authorization node processor configured to authorize the user requesting the session of the service.

22. The system according to claim 13, wherein the authorization node processor is configured to determine whether the user is to be prompted to determine the service provision threshold for the particular session of the service.

23. The system according to claim 13, wherein the charging device processor is located in a communications network of the first mobile operator and wherein the communications network is a global system for mobile communications, general packet radio service, universal mobile telecommunication system, or wireless local area network.

24. The system according to claim 13, wherein the user is visually prompted via a display of the mobile user equipment and wherein the mobile user equipment is a mobile phone, a personal computer, or a personal digital assistant.

25. At least one non-transitory computer readable medium encoded with instructions that, when executed by at least an authorization node processor and a charging device processor, causes at least the authorization node processor and charging device processor to perform a method, the method comprising:
querying, by the authorization node processor, a user profile of a user of a mobile user equipment roaming between a first mobile operator and a second mobile operator, wherein the user is a subscriber of the first mobile operator;
prompting the user, in accordance with the user profile, to input a service provision threshold for a particular session of service and a predetermined action to take when the service provision threshold is reached;
receiving a session control message at the charging device processor residing in a communications network, the session control message initiating a charging with the charging device processor for the particular session of service, wherein the session control message includes the service provision threshold and the predetermined action input by the user, and wherein the particular session of service is requested by the user from the second mobile operator;

identifying with the session control message the service provision threshold input by the user for the particular session of service and the predetermined action to take when the service provision threshold is reached;

translating, by the charging device processor, the service provision threshold to a network resource limit value relevant for the particular session of the service requested from the second mobile operator; and transmitting the network resource limit value from the charging device processor to a service provision node of the second mobile operator, wherein the transmitted network resource limit value prompts the service provision node to meter a provision of the particular session of the service against the network resource limit value and perform the predetermined action when the provision of the particular session reaches the network resource limit value.

26. The at least one computer readable medium according to claim 25, wherein the service provision threshold specifies a cost limit in a currency which is different than a currency used in a location where the user is requesting the particular session of the service.

* * * * *